US008845950B2

(12) United States Patent
Park et al.

(10) Patent No.: US 8,845,950 B2
(45) Date of Patent: Sep. 30, 2014

(54) METHOD FOR MANUFACTURING POLYIMIDE-BASED CARBON NANOFIBER ELECTRODE

(75) Inventors: Dae Wook Park, Hwaseong-si (KR); Hyong Soo Noh, Suwon-si (KR); Hideo Nojima, Seongnam-si (KR); Thi Xuyen Nguyen, Suwon-si (KR); Chul Ho Song, Suwon-si (KR); Young Hee Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1149 days.

(21) Appl. No.: 12/230,699

(22) Filed: Sep. 3, 2008

(65) Prior Publication Data

US 2009/0107842 A1 Apr. 30, 2009

(30) Foreign Application Priority Data

Oct. 24, 2007 (KR) .................. 10-2007-0107256

(51) Int. Cl.
| | | |
|---|---|---|
| *D01F 9/24* | (2006.01) | |
| *H01M 4/96* | (2006.01) | |
| *B82Y 30/00* | (2011.01) | |
| *H01M 4/583* | (2010.01) | |
| *D01D 5/00* | (2006.01) | |
| *D01F 1/10* | (2006.01) | |
| *D01F 6/74* | (2006.01) | |
| *C04B 35/83* | (2006.01) | |
| *C02F 1/461* | (2006.01) | |
| *C02F 1/469* | (2006.01) | |

(52) U.S. Cl.
CPC . *D01F 9/24* (2013.01); *H01M 4/96* (2013.01); *C02F 2201/4617* (2013.01); *B82Y 30/00* (2013.01); *C04B 2235/5288* (2013.01); *H01M 4/583* (2013.01); *D01D 5/0038* (2013.01); *D01F 1/10* (2013.01); *C02F 2001/46133* (2013.01); *C02F 2001/46152* (2013.01); *C04B 2235/5264* (2013.01); *D01F 6/74* (2013.01); *Y02E 60/50* (2013.01); *C02F 1/4695* (2013.01); *C04B 35/83* (2013.01); *Y02E 60/12* (2013.01); *Y10S 977/844* (2013.01)
USPC .......... 264/465; 264/29.2; 264/29.6; 264/29.7; 977/844

(58) Field of Classification Search
None
See application file for complete search history.

(56) References Cited

U.S. PATENT DOCUMENTS 5,585,217 A * 12/1996 Oba .............................. 430/191

FOREIGN PATENT DOCUMENTS

| KR | 2003-0089657 | 11/2003 |
|---|---|---|
| WO | WO 2005044723 A2 * | 5/2005 |

OTHER PUBLICATIONS

Yang et al., Preparation of carbon fiber web from electrostatic spinning of PMDA-ODA poly(amic acid) solution, Carbon, vol. 41, Issue 11, Jul. 31, 2003, pp. 2039-2046.*

(Continued)

*Primary Examiner* — Benjamin Schiffman
(74) *Attorney, Agent, or Firm* — Staas & Halsey LLP

(57) ABSTRACT

A method to manufacture a carbon fiber electrode comprises synthesizing polyamic acid (PAA) as a polyimide (PI) precursor from pyromellitic dian hydride (PMDA) and oxydianiline (ODA) as monomers and triethylamine (TEA) as a catalyst, adding dimethylformamide (DMF) to the polyamic acid (PAA) solution to prepare a spinning solution and subjecting the spinning solution to electrostatic spinning at a high voltage to obtain a PAA nanofiber paper, converting the PAA nanofiber paper into a polyimide (PI) nanofiber paper by heating, and converting the polyimide (PI) nanofiber paper into a carbon nanofiber (CNF) paper by heating under an Ar atmosphere. Also, the method to manufacture a polyimide carbon nanofiber electrode and/or a carbon nanotube composite electrode may utilize carbon nanofibers having diameters that are lessened by optimizing electrostatic spinning in order to improve spinnability.

17 Claims, 9 Drawing Sheets

(56) References Cited

OTHER PUBLICATIONS

Xuyen et al., Enhancement of Conductivity by Diameter Control of Polyimide-Based Electrospun Carbon Nanofibers, J. Phys. Chem. B, Sep. 13, 2007, vol. 111, Issue 39, pp. 11350-11353.*

Frackowiak et al., Carbon materials for the electrochemical storage of energy in capacitors, Carbon, vol. 39, Issue 6, Apr. 9, 2001, pp. 937-950.*

Megelski et al. Micro- and Nanostructured Surface Morphology on Electrospun Polymer Fibers, Macromolecules, vol. 35, Issue 22, Sep. 27, 2002, pp. 8456-8466.*

Frackowiak, Carbon materials for supercapacitor application, Physical Chemistry Chemical Physics, Mar. 7, 2007, vol. 9, pp. 1774-1785.*

Otowa et al. Development of KOH Activated High Surface Area Carbon and Its Application to Drinking Ater Purification, Carbon, 35 (1997), pp. 1315-1319.*

\* cited by examiner

METHOD FOR MANUFACTURING POLYIMIDE-BASED CARBON NANOFIBER ELECTRODE

CROSS-REFERENCE TO RELATED APPLICATIONS

This application claims the benefit of Korean Patent Application No. 2007-0107256, filed on Oct. 24, 2007 in the Korean Intellectual Property Office, the disclosure of which is incorporated herein by reference.

BACKGROUND

1. Field

The present invention relates to a method for manufacturing a polyimide carbon nanofiber electrode and/or a carbon nanotube composite electrode, and a CDI apparatus using the electrode. More specifically, the present invention relates to a method for manufacturing a flat plate electrode from polyimide carbon nanofibers without using any binder and a CDI apparatus using the flat plate electrode.

2. Description of the Related Art

Generally, carbon fibers and activated carbon fibers are classified into polyacrylonitrile (PAN)-based, acryl-based, pitch-based, phenol-based carbon fibers, etc., depending on the starting material to make the fibers.

Carbon fibers are prepared using wet-, melt- or dry-spinning that employs melting PAN-based, acryl-based, pitch-based, or phenol-based polymers, etc., at ambient temperature or a high temperature and then drawing or pulling out fibers from the molten polymers at a physical pressure.

Meanwhile, activated carbon fibers are prepared by activating carbon fibers with water vapor, carbon dioxide, KOH, $ZnCl_2$, etc.

The carbon fibers prepared by these traditional spinning methods almost have a relatively high diameter of about 5 to about 50 μm. Due to the high diameter, the carbon fibers have a low flexural strength and are not thus easy to apply to compress processing.

In recent years, electrostatic spinning (also called "electrospinning") has been used, which is a method capable of preparing ultrafine fibers from polymers via an electrostatic force, in contrast to the spinning methods depending upon a physical force. In accordance with the electrostatic spinning, a polymeric solution, to which a high-voltage electric field is applied, is sprayed to prepare fibers. More specifically, positive (+)-charged ions in the polymeric solution are discharged from an ejector and then adsorbed on a negative (−)-charged electrode collector to produce a nanofiber web.

The preparation of carbon nanofibers or activated carbon nanofibers using the electrostatic spinning is carried out by dissolving PAN, pitch or phenol in a solvent such as meta-cresol, subjecting the resulting solution to electrostatic spinning to prepare carbon nanofibers, and stabilizing, carbonizing or activating the carbon nanofibers.

For example, Korean Patent Laid-open Publication No. 10-2003-0089657 discloses preparation of carbon fibers and activated carbon fibers from polyamic acid (PAA) by electrostatic spinning and its applications to electric double layer supercapacitor electrodes.

More specifically, the afore-mentioned publication paper discloses preparation of polyimide fibers having nanometer-scale diameters with superior electrical conductivity by electrostatic spinning, preparation of carbon nanofibers and activated carbon nanofibers from the polyimide fibers, and the use thereof as electric double layer capacitor electrode materials.

Polyimide is a highly thermal and chemical resistant polymer having an imide group in the repeat units, imide monomers. In spite of these advantages, polyimide has limited applications. The reason is that polyimide has poor processability into a specific shape due to solvent-insolubility and heat resistance (flame resistance).

Accordingly, polyimide processing is carried out by processing polyimide into a specific shape in a PAA precursor solution using a polar solvent and converting the polyimide into imide using a thermal or chemical method.

Thus, the invention disclosed in the publication paper suggests a method for preparing nanometer-scale ultrafine carbon nanofibers and activated carbon nanofibers with a high specific surface area by electrostatic-spinning polyimide with superior electrical conductivity, and applications thereof to an electric double layer capacitor electrode without using any binder.

SUMMARY

However, these conventional methods for preparing polyimide by electrostatic spinning and manufacturing for a supercapacitor electrode material from activated carbon nanofibers have disadvantages in that electrostatic spinning cannot be smoothly performed due to a high viscosity of spinning solution, the diameters of carbon nanofibers cannot be controlled via optimization of complicated conditions, and the surface area of the prepared carbon nanofibers cannot be increased due to their relatively large diameters (i.e., about 400 nm).

In addition, when the conventional supercapacitor electrode material is utilized in a CID apparatus, the supercapacitor electrode cannot efficiently exert its functions on the CID apparatus due to the difference in use conditions between the capacitor and the CID apparatus.

In attempts to solve the problems of the prior art, one object of the present invention is to provide a method for manufacturing a polyimide carbon nanofiber electrode and/or a carbon nanotube composite electrode, wherein the diameters of carbon nanofibers can be lessened by optimizing the electrostatic spinning in order to improve spinnability.

Another aspect of the present invention is to provide a method for manufacturing a polyimide carbon nanofiber electrode and/or a carbon nanotube composite electrode, capable of improving electrical conductivity.

Another aspect of the present invention is to provide a CDI apparatus capable of improving ion collection capability by using the polyimide carbon nanofiber electrode and/or the carbon nanotube composite electrode.

Therefore, in accordance with one aspect of the invention, a method to manufacture a carbon fiber electrode comprises: synthesizing polyamic acid (PAA) as a polyimide (PI) precursor from pryomellitic dianhydride (PMDA) and oxydianiline (ODA) as monomers and triethylamine (TEA) as a catalyst; adding dimethylformamide (DMF) to the polyamic acid (PAA) solution to prepare a spinning solution and subjecting the spinning solution to electrostatic spinning at a high voltage to obtain a PAA nanofiber paper; converting the PAA nanofiber paper into a polyimide (PI) nanofiber paper by heating; and converting the polyimide (PI) nanofiber paper into a carbon nanofiber (CNF) paper by heating under an Ar atmosphere.

The method may further comprise: activating the CNF paper by acid- or base-treatment to increase the surface area of the CNF paper and control the distribution of pores in the CNF paper; and subjecting the CNF paper to acid-treatment and heat-treatment to distribute mesopores into the CNF paper.

An amount of the TEA catalyst contained in the spinning solution may be 1 to 5% by weight.

The content of the PAA polymers contained in the spinning solution may be 17 to 20% by weight.

The conversion of the polyimide (PI) nanofiber paper into a carbon nanofiber (CNF) paper may further include: pressurizing the polyimide (PI) nanofiber paper to increase electrical conductivity of the carbon nanofiber (CNF) paper.

The acid-treatment may be carried out by treating the CNF paper with nitric acid and the heat-treatment may be carried out by heating the CNF paper at 400° C.

The capacitive deionization (CDI) apparatus according to the present invention comprises the carbon fiber electrode manufactured according to the method.

In accordance with another aspect of the invention, a method to manufacture a carbon nanotube composite electrode comprises: sequentailly adding carbon nanotubes (CNTs) and triethylamine (TEA) as a catalyst to pryomellitic dianhydride (PMDA) and oxydianiline (ODA) as monomers to synthesize a polyamic acid/carbon nanotube (PAA/CNT) composite; subjecting the PAA/CNT composite spinning solution to electrostatic spinning to obtain a PAA/CNT nanofiber paper; converting the PAA/CNT nanofiber paper into a polyimide/carbon nanotube (PI/CNT) nanofiber paper by heating; and converting the PI/CNT nanofiber paper into a carbon nanofiber/carbon nanotube (CNF/CNT) composite by heating under an Ar atmosphere.

A content of the CNT in the CNF/CNT composite may be 0.001 to 50% by weight.

The method may further comprise: activating the CNF/CNT composite by acid- or base-treatment to increase the surface area of the CNF/CNT composite and control the distribution of pores in the the CNF/CNT composite; and subjecting the CNF/CNT composite to acid-treatment and heat-treatment to distribute mesopores into the CNF/CNT composite.

The method may further comprise: after the activation, subjecting the CNF/CNT composite to acid-treatment and heat treatment to distribute mesopores in the CNF/CNT composite.

The capacitive deionization (CDI) apparatus according to the present invention comprises the carbon nanotube composite electrode manufactured according to the method.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7($b$) is an electron microscope image of PI nanofibers prepared in accordance with a preferred embodiment of the present invention;

FIG. 7($c$) is an electron microscope image of CNT nanofibers prepared in accordance with a preferred embodiment of the present invention;

DETAILED DESCRIPTION OF EMBODIMENTS

Figure 1:
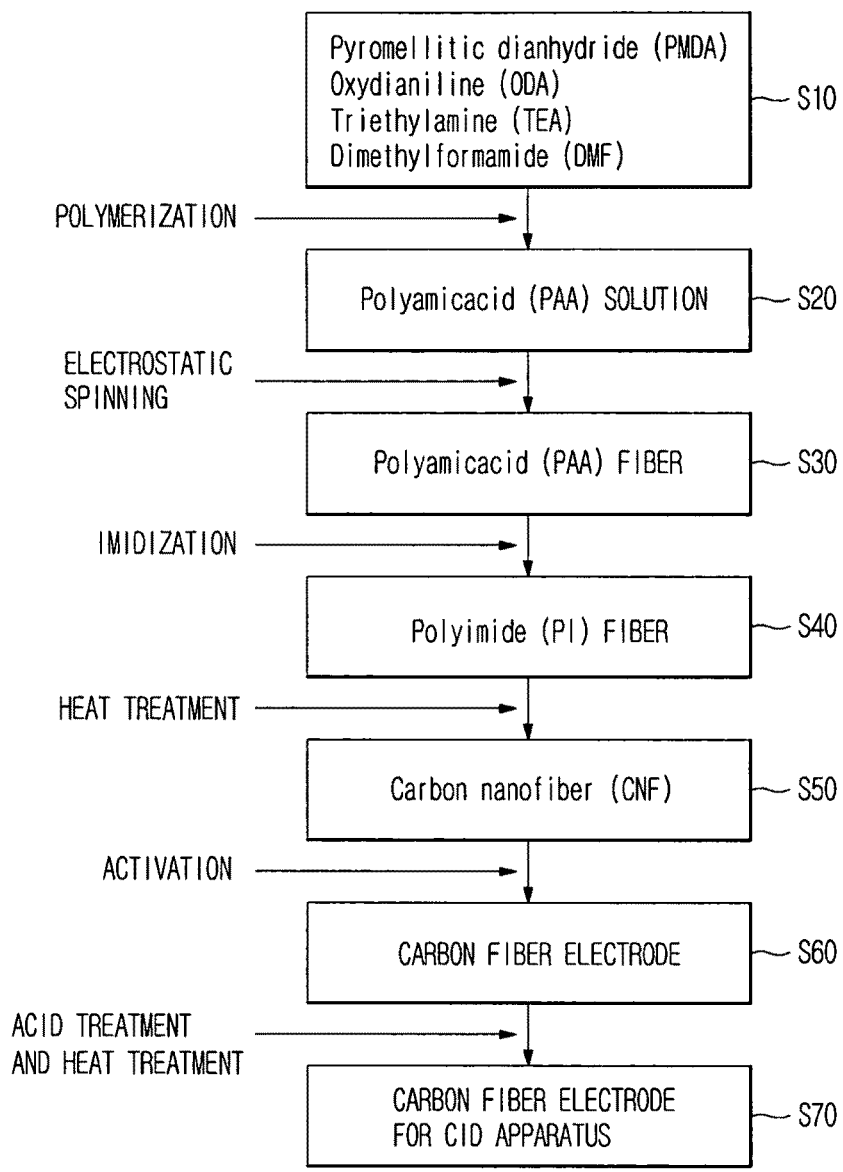
FIG. 1 is a flow chart illustrating a method to manufacture a carbon fiber electrode according to a preferred embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a flow chart illustrating a method to manufacture a carbon fiber electrode according to a preferred embodiment of the present invention.

First, in order to synthesize polyamic acid (PAA) as a polyimide (PI) precursor, 4 g of oxydianiline (ODA) is dissolved in 20 g of dimethylformamide (DMF). After the resulting solution is allowed to stand at 5° C., 4.4 g of pyromellitic dianhydride (PMDA) is slowly added thereto over 30 minutes with stirring, to obtain the targeted polyamic acid (PAA).

In this embodiment, the weights of ODA, DMF and PMD are not intended to be restricted to the aforementioned specific values and are given for illustrating one example wherein a polyamic acid solution in which a weight ratio of ODA, DMF and PMD is approximately in the range of 4 20:4.4 is prepared.

After the solution is allowed to stand at −5° C., triethylamine (TEA) as a catalyst is added thereto (S10) and mixed until polymerization is completed. An amount of the TEA catalyst used herein is in the range of 1 to 5% by weight to control a molecular weight.

The PAA solution thus prepared is given as a colorless liquid. To the solution, is further added DMF to adjust the content of the PAA to 20 wt %, and thereby to obtain a PAA/DMF solution (referred to as a "spinning solution") (S20). The PAA/DMF solution is subjected to electrostatic spinning to obtain a PAA nanofiber paper (S30).

Figure 2:
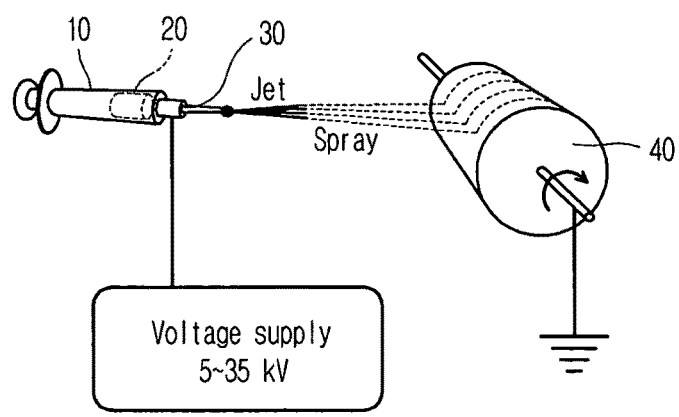
FIG. 2 is a view illustrating an electrostatic spinning apparatus used to manufacture the carbon fiber electrode according to the preferred embodiment of the present invention.

FIG. 2 is a view illustrating an electrostatic spinning apparatus used to manufacture the carbon fiber electrode according to the preferred embodiment of the present invention.

As shown in FIG. 2, the electrostatic spinning apparatus used in the present invention comprises a syringe 10 to inject a spinning solution and a cylindrical collector 20 covered with aluminum foil.

The syringe 10 used to inject the spinning solution has an inner diameter of 2 cm and a length of 10 cm. The syringe 10 is provided at an end with a nozzle 30 having an inner diameter 0.5 mm and is filled with a spinning solution 40 (PAA/DMF solution). The collector 20 and the nozzle 30 are spaced apart from each other at a distance of about 15 cm.

In the fabrication of the carbon fiber electrode according to the preferred embodiment of the present invention, electrostatic spinning is optimized to design a stable Taylor cone-jet by controlling a spinning voltage and a flow rate depending upon the PAA molecular weight and solid content (wt %) using the electrostatic spinning apparatus having the aforementioned structure.

In this embodiment, triethylamine (TEA) is used as a catalyst. The embodiment is different from conventional cases using no catalyst, in terms of the tissue structure of the electrospun carbon fibers. That is, in conventional cases using no catalyst, carbon fibers with non-uniform diameters in which beads are dispersed are obtained, and on the other hand, in the preferred embodiments of the present invention using the catalyst, carbon fibers with a uniform diameter are obtained, independent of the amount of the catalyst (not less than about 1 wt %).

Figure 3:
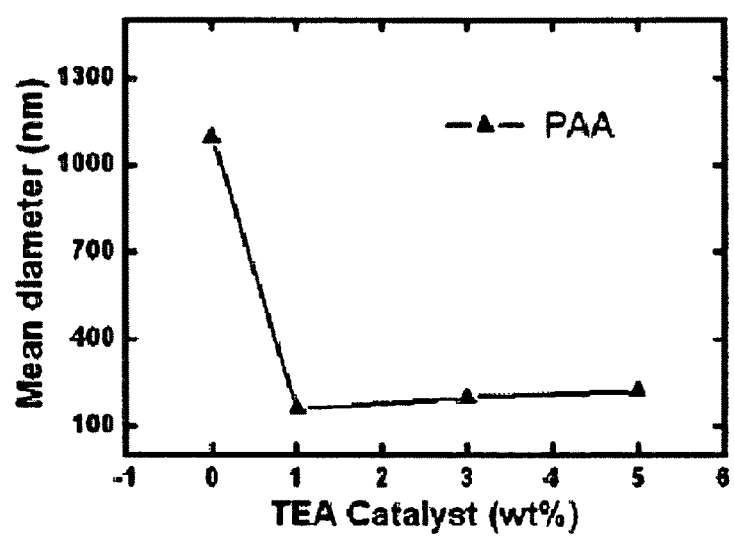
FIG. 3 is a graph showing a mean diameter of PAA fibers prepared by electrostatic spinning under the conditions that a content of PAA polymers in the spinning solution is kept constant and a TEA catalyst amount is varied.
Figure 4:
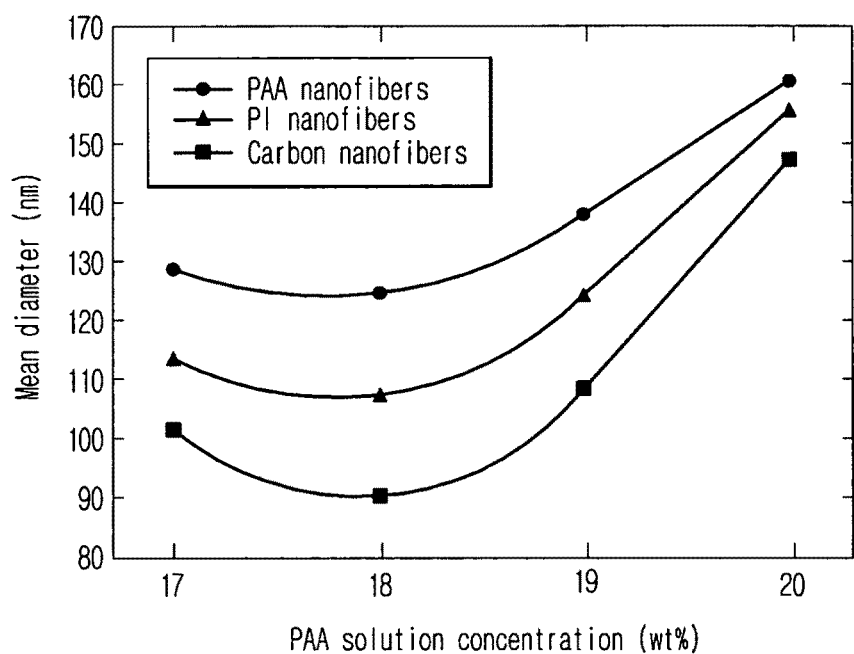
FIG. 4 is a graph showing mean diameters of PAA nanofibers, PI nanofibers and carbon nanofibers prepared by electrostatic spinning under the conditions that a TEA catalyst amount is kept constant and a content of PAA polymers is varied.

FIG. 3 is a graph showing a mean diameter of PAA fibers prepared by electrostatic spinning under the conditions that a content of PAA polymers in the spinning solution is kept constant and a TEA catalyst amount is varied. FIG. 4 is a graph showing mean diameters of PAA nanofibers, PI nanofibers and carbon nanofibers prepared by electrostatic spinning under the conditions that a TEA catalyst amount is kept constant and a content of PAA polymers is varied.

The diameter of the spun nanofibers is varied dependent upon an amount of the catalyst used for the polymerization and a content (wt %) of PAA polymers in the spinning solution. When the content of the PAA polymers is maintained at 20 wt % and the amount of the TEA catalyst is sequentially varied to 1, 3 and 5 wt %, as shown in FIG. 3, a mean diameter of the PAA fibers is gradually increased to 160 nm, 200 nm and 225 nm, respectively. When the catalyst amount is kept at 1 wt % and the PAA polymer content is varied in the range of 17 to 20 wt %, the PAA nanofibers prepared from the spinning solution, wherein the PAA polymer content is 18 wt %, had the smallest mean diameter of about 125 nm.

These experiment results ascertained that the lower the amount of the TEA catalyst, the smaller the mean diameter of the PAA nanofibers, and when the PAA polymer content is 18 wt %, the PAA nanofiber diameter is minimized. Accordingly, it may be considered preferable to make the amount of the TEA catalyst as low as possible in order to lessen the diameter of the PAA nanofibers. However, when the TEA catalyst amount is lower than 1 wt %, as mentioned above, rather, PAA nanofibers whose mean diameter is increased and which are non-uniform are obtained. Preferably, the diameters of PAA nanofibers are minimized by utilizing the TEA catalyst amount and the PAA polymer content of about 1 wt % and about 18 wt %, respectively.

Figure 5:
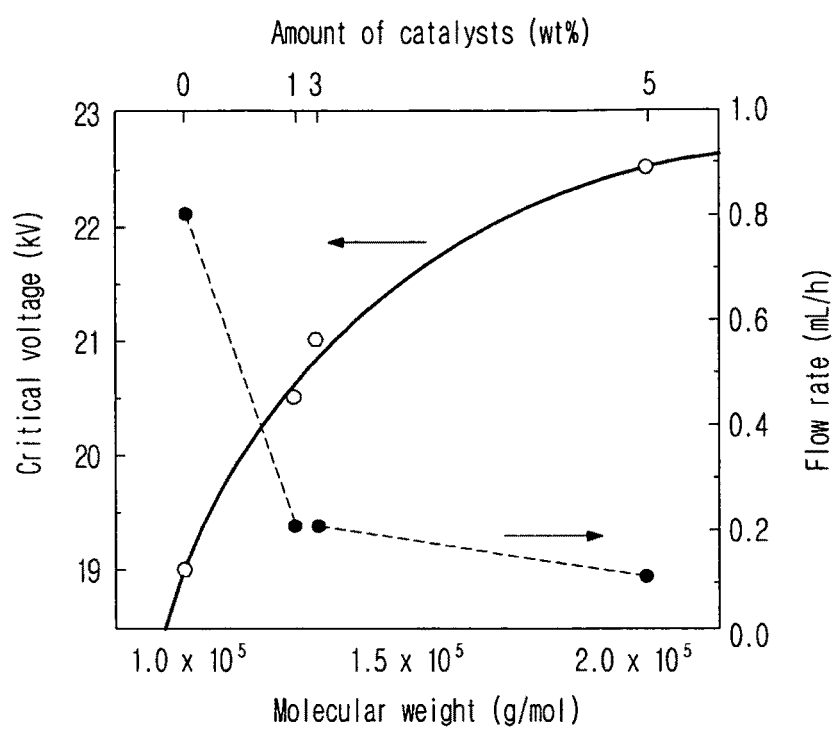
FIG. 5 is a graph showing correlation between the molecular weight, voltage and flow rate obtained under optimum electrostatic spinning conditions, while constantly maintaining the amount of PAA polymers in the spinning solution in the manufacturing process of FIG. 1.

FIG. 5 is a graph showing correlation between the molecular weight, voltage and flow rate obtained under optimum electrostatic spinning conditions, while constantly maintaining the amount of PAA polymers in the spinning solution in the manufacturing process of FIG. 1.

As can be seen from FIG. 5, under the condition that the amount of PAA polymers contained in the spinning solution is maintained at 20 wt %, the PAA molecular weight (lower horizontal axis) is varied dependent upon the catalyst amount (upper horizontal axis), and the PAA molecular weight affects the spinning conditions.

That is, as the molecular weight of the PAA polymers becomes smaller, the critical voltage of the electrostatic spinning decreases, and as the molecular weight of the PAA polymers becomes larger, the critical voltage gradually increases, and then reaches a limit voltage.

As may be confirmed from FIG. 5, the electrostatic spinning is optimized, under the condition that a flow rate of the spinning solution is also decreased, as the molecular weight becomes larger.

The graph of FIG. 5 indicates that according to the molecular weight, a critical voltage (left vertical axis) and a flow rate (right vertical axis) are varied. The optimum voltage and the flow rate of electrostatic spinning may be determined according to variation in the molecular weight of the PAA polymers.

As may be seen from FIG. 5, under the condition that an amount of the PAA contained in the spinning solution is set at 20 wt %, when the catalyst is used in an amount of 1 wt %, the PAA molecular weight, the voltage and the flow rate are determined at about 1.25 g/mol, 20.5 kV and 0.2 mL/H, respectively, to thereby obtain optimum spinning conditions.

Consequently, with the method of manufacturing the carbon nanofiber electrode according to the preferred embodiment of the present invention, the diameter of the PAA fibers may be adjusted to about 100 nm by controlling the electrostatic spinning conditions (e.g., a molecular weight and content (%) of the PAA polymers, a voltage and a flow rate) that affect the diameter of the carbon fibers.

After the PAA nanofiber papers are obtained by electrostatic spinning as mentioned above, the PAA nanofiber papers are converted into polyimide through a series of heating steps in air, to obtain polyimide (PI) nanofiber papers (S40).

The series of heating is carried out by heating the PAA nanofiber papers at 100° C. for 2 hours, at 250° C. for 2 hours, and at 350° C. for 2 hours. At this time, the heating rate is 5° C./min. After imidization through the heating process, the mean diameter of the nanofibers is decreased by about 5 to 15%, as is shown in FIG. 5.

Then, the polyimide (PI) nanofiber papers are carbonized by heating (S50).

More specifically, the PI nanofiber papers are carbonized at 1,000° C. under an Ar atmosphere to convert the PI nanofiber papers into carbon nanofiber (CNF) papers.

The carbonization of PI nanofiber papers is sequentially carried out by elevating the temperature from ambient temperature to 600° C. over about one hour, and from 600° C. to 1000° C. over about 1.3 hour and then by maintaining at 1,000° C. over one hour.

Before the carbonization, the thickness of PI nanofiber papers was 397 μm. After the carbonization, the thickness of PI nanofiber papers is slightly decreased to 379 μm. As shown in FIG. 4, the diameter of carbon nanofibers is slightly decreased by about 10 to 18%, as compared to that of polyimide nanofibers.

Accordingly, when the content of the PAA polymers in the spinning solution is adjusted to 18 wt % and the electrostatic spinning conditions are satisfied, carbon nanofibers with a mean diameter of about 90 nm may be prepared and a specific surface area of carbon nanofiber electrodes may thus be increased.

Figure 6:
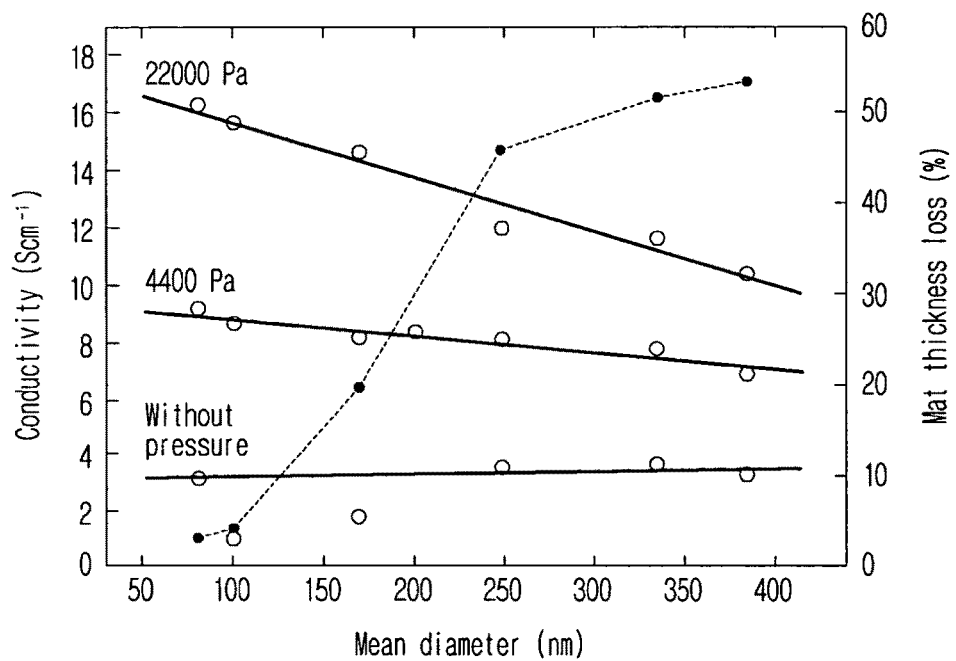
FIG. 6 is a graph showing a correlation between a diameter of carbon nanofibers according to the preferred embodiment of the present invention, an electrical conductivity and a pressure.

FIG. 6 is a graph showing correlation between a diameter of carbon nanofibers according to the preferred embodiment of the present invention, an electrical conductivity and a pressure.

The electrical conductivity of the carbon nanofiber papers obtained in the present embodiment varies depending upon the diameter of the carbon nanofibers. As the diameter of the carbon nanofibers becomes smaller, the electrical conductivity increases. As shown in FIG. 5, the electrical conductivity is increased by pressurizing the carbon nanofiber papers during the carbonization.

That is, in the case where the diameter of the carbon nanofibers is 100 nm, when a pressure of 4400 Pa is applied to the carbon nanofibers, the electrical conductivity thereof is about 9 S/cm, and when a pressure of 22,000 Pa is applied thereto, the electrical conductivity thereof is about 16 S/cm.

Accordingly, in the process of manufacturing the carbon nanofiber electrode according to the preferred embodiment of the present invention, the carbonization is performed together with pressurization, to improve the electrical conductivity of the carbon nanofiber electrode.

Then, the carbon fiber papers thus carbonized are activated by surface-treatment in order to increase the surface area of the carbonized carbon fiber papers for use in a CDI electrode, to produce a carbon fiber electrode (S60).

The activation of the carbon fiber papers is carried out by primarily heating the carbon fibers and KOH in a ratio of 1:2 to 1:4 at 400° C. and then by activating the resulting materials at 700 to 1,000° C. under a nitrogen atmosphere. The primary heating time and the activation time are each in the range of 1 to 2 hours.

Then, in order to introduce mesopores having a size of about 2 to 50 nm into the carbon fiber papers, the carbon fiber electrode is repeatedly (i.e., about 5 to 10 times) subjected to treatment with 1 M nitric acid and heat-treatment at 400° C., to form a carbon fiber electrode for a CDI apparatus (S70). At this time, the nitric acid treatment time and the heating time are about 20 minutes and about 30 minutes, respectively.

As mentioned above, when the carbon fiber electrode prepared in accordance with the method of the present invention is applied to a CDI apparatus, the ion collection capability of the CDI apparatus can be improved by introducing mesopores into the carbon fiber papers.

Figure 7:
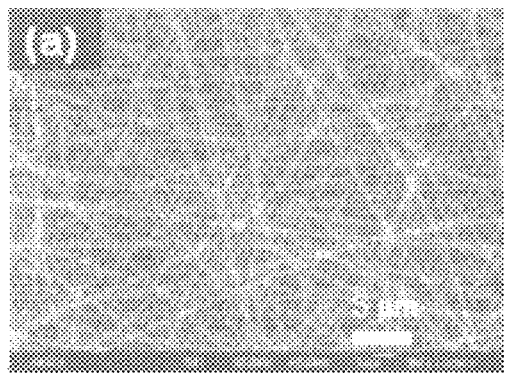
FIG. 7($a$) is an electron microscope image of PAA nanofibers prepared in accordance with a preferred embodiment of the present invention.
Figure 7:
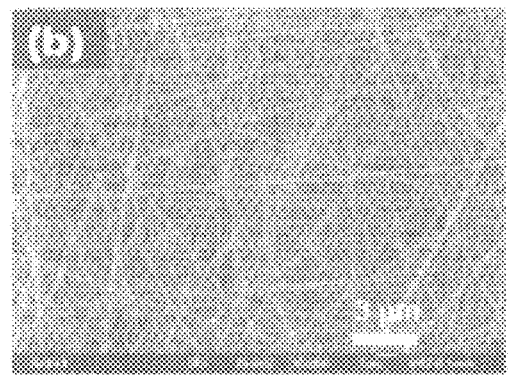
Figure 7:
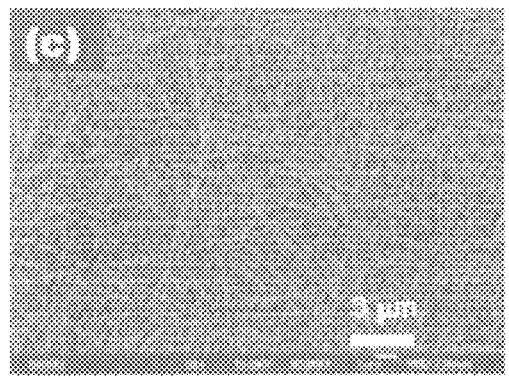

FIG. 7(*a*) is an electron microscope image of PAA nanofibers prepared in accordance with the preferred embodiment of the present invention. FIG. 7(*b*) is an electron microscope image of PI nanofibers prepared in accordance with the preferred embodiment of the present invention. FIG. 7(*c*) is an electron microscope image of CNT (carbon nanotube) nanofibers prepared in accordance with the preferred embodiment of the present invention. As is apparent from FIGS. 7(*a*)-7(*c*), the PAA nanofibers, PI nanofibers and carbon nanotube nanofibers prepared in accordance with the preferred embodiment of the present invention are decreased in size.

Hereinafter, a method to manufacture a carbon nanotube composite electrode according to the preferred embodiment of the present invention will be illustrated.

Figure 8:
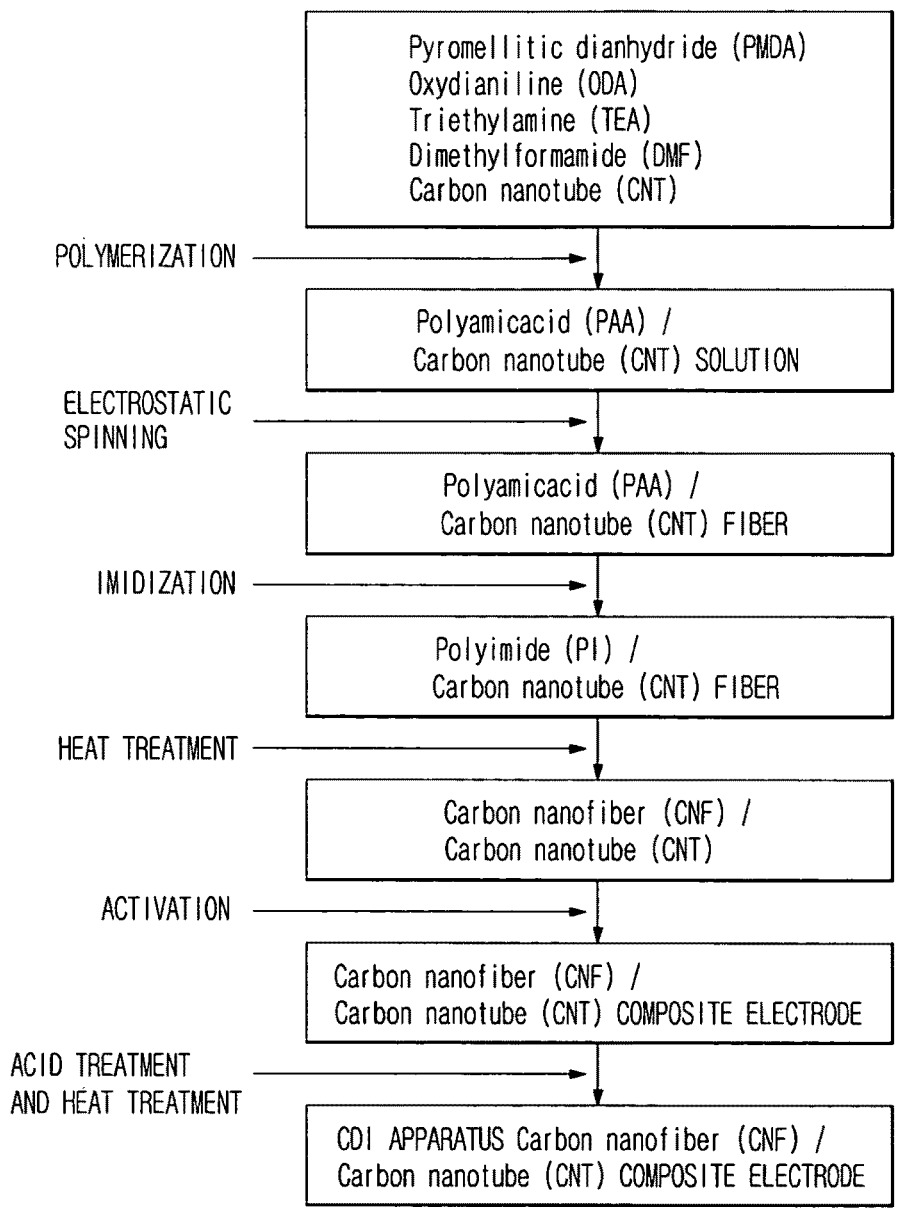
FIG. 8 is a flow chart illustrating a method to manufacture a carbon nanotube composite electrode according to a preferred embodiment of the present invention.

FIG. 8 is a flow chart illustrating a method to manufacture the carbon nanotube composite electrode according to the preferred embodiment of the present invention.

The manufacturing of the CNT/PAA composite according to the preferred embodiment of the present invention is carried out in the same manner as in the manufacturing of the carbon nanofiber electrode, except that the synthesis of PAA and the introduction of carbon nanotubes (CNTs) are used.

The carbon nanotubes used herein may have a diameter of about 0.4 nm to about 200 nm. Depending upon the number of the walls of carbon nanotubes, single-walled carbon nanotubes (SWCNTs) or multi-walled carbon nanotubes (MWCNTs) may be used.

The CNTs are homogeneously dispersed in DMF using a method such as ultrasonic wave treatment or stirring, and an ODA /DMF solution is added thereto. Then, PMDA and a TEA catalyst are added to the resulting mixture and then the mixture is subjected to polymerization.

At this time, the weight of CNTs in the CNT/PAA composite is preferably in the range of 0.001% to 50%. The CNT/PAA composite in which a percolation threshold of the CNTs is observed near 0.001% and the CNT content is 50% may be used.

Then, the resulting polymers are subjected to electrostatic spinning to prepare PAA/CNT fibers. The PA/CNT fibers are imidized to prepare a PI/CNT composite. Then, the PAA/CNT composite is heated for carbonization and activated to manufacture a CNF/CNT composite electrode.

Then, the resulting CNF/CNT composite electrode is subjected to acid treatment and heat treatment to obtain the final CNF/CNT composite electrode for a CDI apparatus, capable of improving the efficiency of the CDI apparatus.

This manufacturing process is carried out under the same conditions as in the manufacturing process of the carbon fiber electrode according to the preferred embodiment of the present invention. Thus, a more detail thereof will be omitted.

Hereinafter, a CDI apparatus using the carbon fiber electrode and/or carbon nanotube composite electrode manufactured prepared in accordance with the afore-mentioned method will be illustrated.

The technology called capacitive deionization (CDI) is based on a simple principle that when a voltage is applied across two electrodes of a positive electrode and a negative electrode, negative ions are electrically adsorbed on the positive electrode and positive ions are electrically adsorbed on the negative electrode to remove the ions dissolved in a fluid such as water. In accordance with the CDI, when the ions are saturatedly adsorbed on the electrode, they can be readily desorbed by reversing the polarity of the electrode, thus making it simple to recycle the electrode.

Unlike other methods such as an ion exchange resin method and reverse osmosis, the CDI does not employ a cleaning solution, e.g., an acid or a base, for the purpose of recycling the electrode, thus advantageously being free of the secondary-production of chemical wastes. The CDI has great advantages of a semi-permanent lifespan due to almost freedom from corrosion or contamination and a 10- to 20-fold energy savings due to high energy efficiency, as compared to other methods.

Figure 9:
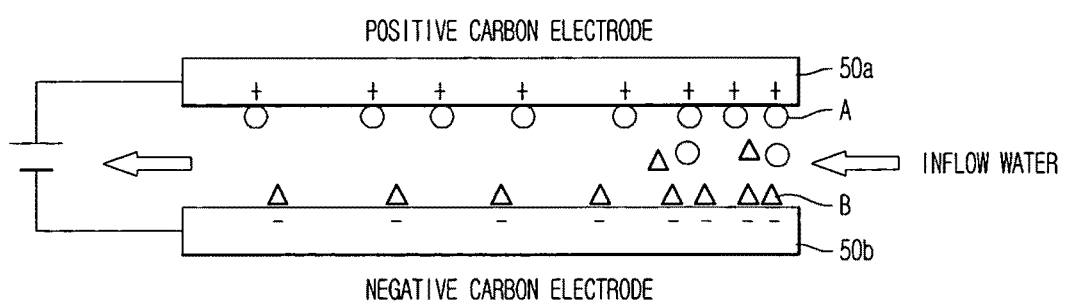
FIG. 9 is a schematic diagram illustrating a CDI apparatus comprising the carbon nanofiber electrode or the carbon nanotube composite electrode manufactured according to the present invention.

FIG. 9 is a schematic diagram illustrating a CDI apparatus comprising a carbon nanofiber electrode or a carbon nanotube composite electrode prepared according to the present invention.

To apply the CNF porous carbon electrodes (or CNF/CNT porous carbon electrodes) 50*a* and 50*b* thus manufactured to a CDI apparatus, the electrodes 50*a* and 50*b* are made to a size of 10 cm×10 cm, and a CID system consisting of 20 cells is then obtained. The electrodes are designed to be spaced apart from each other at a distance of 1 mm using a spacer (not shown). Graphite is used as a collector.

When a voltage of 0 to 1.2 V is applied to the positive electrode, negative ions are adsorbed on the positive carbon electrode 50*a* and positive ions are adsorbed on the negative carbon electrode 50*b*. At this time, when hard water of 1,000 ppm is treated at a flow rate of 100 ml/min, an ion removal ratio and an ion recovery ratio are 90% and 70%, respectively.

The carbon nanofiber electrode and carbon nanotube composite electrode according to the method of the present invention may be used in the field of water treatment including sea water desalination facilities, water purifying plants, wastewater utilities, semiconductor wastewater treatment utilities, water purifiers, water conditioners, washing machines, dishwashers, air conditioners (water suppliers of water-quenching heat-exchangers), steam cleaners, boiler scale control facilities, etc. Furthermore, the carbon nanofiber electrode and the carbon nanotube composite electrode may be used not only in all treatment facilities and products that employ the principle of adsorbing/desorbing ions dissolved in water by electricity, but also in the field of supercapacitors.

As is apparent from the foregoing, the method according to the present invention, the carbon nanofiber electrode and/or a carbon nanotube composite electrode are manufactured using triethylamine (TEA) as a catalyst to synthesize polyamic acid (PAA) as a polyimide (PI) precursor. As a result, diameters of carbon fibers may be minimized, and a specific surface area of the carbon fiber electrode may be thus increased.

In the process of manufacturing the carbon nanofiber electrode and/or carbon nanotube composite electrode, the carbonization is performed together with pressurization. Accordingly, it is possible to improve electrical conductivity of the electrodes.

The CDI apparatus according to the present invention uses the carbon nanofiber electrode and/or the carbon nanotube composite electrode manufactured by the method, thus advantageously exhibiting an improved ion collection capability.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method to manufacture a carbon fiber electrode comprising:
    synthesizing polyamic acid (PAA) as a polyimide (PI) precursor from pryomellitic dianhydride (PMDA) and oxydianiline (ODA) as monomers and triethylamine (TEA) as a catalyst;
    adding dimethylformamide (DMF) to the polyamic acid (PAA) solution to prepare a spinning solution and subjecting the spinning solution to electrostatic spinning at a high voltage to obtain a PAA nanofiber paper;
    converting the PAA nanofiber paper into a polyimide (PI) nanofiber paper by heating;
    converting the polyimide (PI) nanofiber paper into a carbon nanofiber (CNF) paper by heating under an Ar atmosphere and activating to obtain the carbon fiber electrode; and
    applying a base-treatment to activate the CNF paper to increase a surface area of the CNF paper and control the distribution of pores in the CNF paper;
    subjecting the CNF paper repeatedly to an acid-treatment and heat-treatment to distribute mesopores in the size of 2 to 50 nm into the CNF paper;
    wherein applying a base-treatment to activate CNF paper comprises heating at a CNF to base ratio of about 1:2 to about 1:4 in a first heating stage at a first temperature and in a second heating stage heating the resulting material at a second temperature.

2. The method according to claim 1, wherein an amount of the TEA catalyst contained in the spinning solution is 1 to 5% by weight.

3. The method according to claim 1, wherein a content of the PAA polymers contained in the spinning solution is 17 to 20% by weight.

4. The method according to claim 1, wherein the conversion of the polyimide (PI) nanofiber paper into a carbon nanofiber (CNF) paper further includes:
    pressurizing the polyimide (PI) nanofiber paper to increase electrical conductivity of the carbon nanofiber (CNF) paper.

5. A method to manufacture a carbon nanotube composite electrode comprising:
    sequentially adding carbon nanotubes (CNTs) and triethylamine (TEA) as a catalyst to pryomellitic dianhydride (PMDA) and oxydianiline (ODA) as monomers to synthesize a polyamic acid/carbon nanotube (PAA/CNT) composite;
    subjecting the PAA/CNT composite spinning solution to electrostatic spinning to obtain a PAA'CNT nanofiber paper;
    converting the PAA/CNT nanofiber paper into a polyimide/carbon nanotube (PI/CNT) nanofiber paper by heating; and
    converting the PI/CNT nanofiber paper into a carbon nanofiber/carbon nanotube (CNF/CNT) composite electrode by heating under an Ar;
    applying a base-treatment to activate the CNF paper to increase a surface area of the CNF paper and control the distribution of pores in the CNF paper; and
    subjecting the CNF paper repeatedly to an acid-treatment and heat-treatment to distribute mesopores in the size of 2 to 50 nm into the CNF paper;
    wherein applying a base-treatment to activate CNF paper comprises heating at a CNF to base ratio of about 1:2 to about 1:4 in a first heating stage at a first temperature and in a second heating stage heating the resulting material at a second temperature.

6. The method according to claim 5, wherein a content of the CNT in the CNF/CNT composite is 0.001 to 50% by weight.

7. The method according to claim 5, further comprising:
    activating the CNF/CNT composite by acid- or base-treatment to increase a surface area of the CNF/CNT composite and control a distribution of pores in the the CNF/CNT composite; and
    subjecting the CNF/CNT composite to acid-treatment and heat-treatment to distribute mesopores into the CNF/CNT composite.

8. The method according to claim 7, further comprising:
    after the activation, subjecting the CNF/CNT composite to acid-treatment and heat treatment to distribute mesopores in the CNF/CNT composite.

9. A method to manufacture a carbon fiber electrode comprising:
    cooling a solution of oxydianiline (ODA) and adding pryomellitic dianhydride (PMDA) thereto over a predetermined period of time to synthesize polyamic acid (PM);
    cooling the solution and adding triethylamine (TEA) as a catalyst and mixing the solution until polymerization of the PAA is completed;
    adding DMF to obtain a spinning solution of PAA/DMF;
    electrostatic spinning of the spinning solution of PAA/DMF to obtain a PAA nanofiber paper;
    converting the PM nanofiber paper into polyimide (PI) by heating;

carbonizing the PI nanofiber papers by heating and pressurization under an Ar atmosphere to convert the PI nanofiber paper into carbon nanofiber (CNF) paper;

applying a base-treatment to activate the CNF paper to increase a surface area of the CNF paper and control the distribution of pores in the CNF paper: and subjecting the CNF paper repeatedly to an acid-treatment and heat-treatment to distribute mesopores in the size of 2 to 50 nm into the CNF paper;

wherein applying a base-treatment to activate CNF paper comprises heating at a CNF to base ratio of about 1:2 to about i:4 in a first heating stage at a first temperature and in a second heating stage heating the resulting material at a second temperature.

10. The method according to claim 9, wherein a weight ratio of ODA : DMF: PMD is 4 : 20: 4.4.

11. The method according to claim 9, wherein an amount of TEA catalyst is in a range of 1 to 5% by weight.

12. The method according to claim 11, wherein a content of PAA polymers in the spinning solution is kept constant and the amount of TEA catalyst is varied.

13. The method according to claim 12, wherein the content of PAA polymers is maintained at 20 wt %.

14. The method according to claim 13, a molecular weight of the PAA polymers is varied dependent upon a catalyst amount, affecting spinning conditions.

15. The method according to claim 14, wherein as the molecular weight of the PAA polymers becomes smaller, a critical voltage of the electrostatic spinning decreases, and as the molecular weight of the PAA polymers becomes larger, the critical voltage of the electrostatic spinning gradually increases and reaches a limit voltage.

16. The method according to claim 9, wherein the electrostatic spinning is optimized when a flow rate of the spinning solution is decreased as the molecular weight increases.

17. The method according to claim 9, wherein optimized spinning conditions are utilized to obtain a diameter of PAA nanofibers of about 100 nm.

* * * * *

UNITED STATES PATENT AND TRADEMARK OFFICE
CERTIFICATE OF CORRECTION

| | | |
|---|---|---|
| PATENT NO. | : 8,845,950 B2 | Page 1 of 1 |
| APPLICATION NO. | : 12/230699 | |
| DATED | : September 30, 2014 | |
| INVENTOR(S) | : Dae Wook Park et al. | |

It is certified that error appears in the above-identified patent and that said Letters Patent is hereby corrected as shown below:

On the Title page

On Page 1

Column 2, Item [56] (Other Publications), line 2, delete "poly(amic acid)" and insert -- (polyamic acid) --, therefor.
Column 2, Item [57] (Abstract), line 3, delete "pryomellitic dian hydride" and insert -- pyromellitic dianhydride --, therefor.

On the Page 2

Column 2, Item [56] (Other Publications), line 8, delete "Ater" and insert -- Water --, therefor.

In the Claims

Column 10, line 17, in Claim 5, delete "pryomellitic" and insert -- pyromellitic --, therefor.
Column 10, line 21, in Claim 5, delete "PAA'CNT" and insert -- PAA/CNT --, therefor.
Column 10, line 31, in Claim 5, delete "paper; and" and insert -- paper: and --, therefor.
Column 10, line 46, in Claim 7, delete "the the" and insert -- the --, therefor.
Column 10, lines 57-58, in Claim 9, delete "pryomellitic" and insert -- pyromellitic --, therefor.
Column 10, line 59, in Claim 9, delete "(PM);" and insert -- (PAA); --, therefor.
Column 10, line 66, in Claim 9, delete "PM" and insert -- PAA --, therefor.
Column 11, line 12, in Claim 9, delete "i:4" and insert -- 1:4 --, therefor.

Signed and Sealed this
Fifteenth Day of September, 2015

Michelle K. Lee
*Director of the United States Patent and Trademark Office*